J. B. CLARK.
SLAG NET.
APPLICATION FILED AUG. 7, 1908.

926,719.

Patented June 29, 1909.

WITNESSES

INVENTOR
J. B. Clark,
by Bakewell, Byrnes & Parmelee,
his Attys.

UNITED STATES PATENT OFFICE.

JOHN BERNARD CLARK, OF CLEVELAND, OHIO.

SLAG-NET.

No. 926,719. Specification of Letters Patent. Patented June 29, 1909.

Application filed August 7, 1908. Serial No. 447,353.

*To all whom it may concern:*

Be it known that I, JOHN BERNARD CLARK, of Cleveland, Cuyahoga county, Ohio, have invented a new and useful Slag-Net, of which the following is a full, clear, and exact description, reference being had to the accompanying drawings, forming part of this specification, in which—

Figure 1:
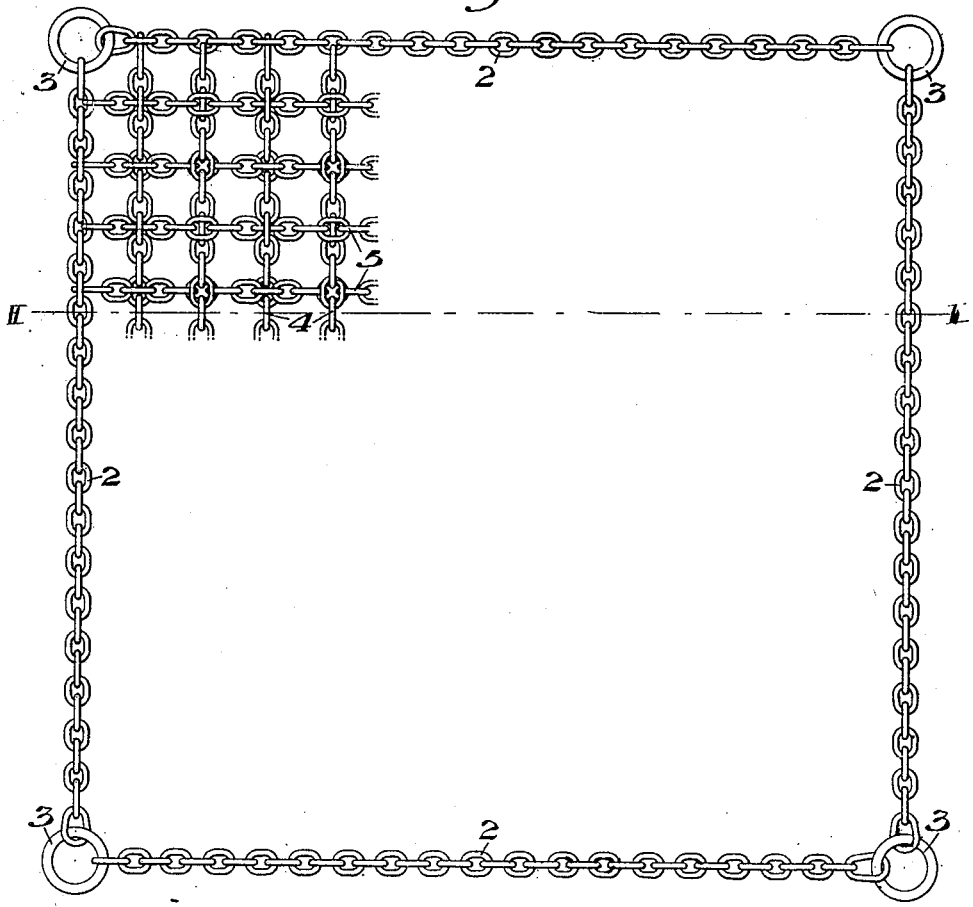
Figure 2:

Figure 1 is a plan view of the net and Fig. 2 is a cross-section on the line II—II of Fig. 1.

My invention relates to the handling of slag and mill cinder, and has for its object the handling of the slag or cinder in a cheap, inexpensive and efficient manner. It is the common practice when slag or cinder is removed from converters or furnaces to take it away on cars or in pans, after it has hardened, to a cinder dump, where the cinder from the car or pan is dumped on the ground. It is afterward broken up to recover any scrap which may be therein and to reduce it to a suitable size for further use. The cinder, if it is to be further used, must then be shoveled by hand into a suitable vehicle for removal; but frequently owing to the expense of treating it in this way and the discomfort of and danger to the workmen from the hot cinder, the cinder is merely dumped and the scrap is recovered. This accumulation of cinder is a great detriment to the plant, inasmuch as it often occupies a large amount of valuable space.

In accordance with my invention, I provide a flexible metallic net upon which the cinder can be dumped from the cinder cars or pans, and in which it can be broken by dropping a ball or skull-cracker thereon. The net can then be gathered up around its contents and picked up by a crane and dumped into a car or carried to any desired place of deposit, without any shoveling or other handling of the cinder.

The preferred construction of the metallic net is shown in the accompanying drawing, wherein I have shown it as consisting of four outer bounding chains 2, whose adjacent ends are connected at the corners by rings 3, which are designed to be engaged by the hooks of a crane or other hoist. The body of the net is shown as consisting of a mesh formed by interwoven chains 4 and 5, whose ends are linked to the outer or bounding chain 2. Each chain of one series is alternately passed over and under the chains of the other series in the manner shown in Fig. 2. The net thus formed is strong and durable, and the slag or cinder can be broken or crushed thereon by any suitable skull-cracker without injuring the net. The net can then be gathered up around the slag, and the rings 3 engaged by the hooks of a hoist by means of which it can be transported to any desired point and the contents dumped.

The advantages of my invention will be apparent, since it provides simple and convenient means upon which cinder or slag may be broken or crushed and then removed, without the necessity of separately picking up and handling the separate pieces.

The mesh of the net may be of any desired size, and wire cables may be used in its construction instead of chains. The latter are, however, preferred, owing to their greater flexibility and the readiness with which a broken link can be replaced. The net can also be used to advantage in handling and conveying scrap of various kinds.

I claim:—

1. As a new article of manufacture, a flexible metallic slag and cinder net having elevated portions spaced apart sufficiently far to constitute independent points of support and to admit of the breaking of pieces of slag or cinder resting on said net, for the purpose described.

2. As a new article of manufacture, a flexible metallic slag and cinder net having elevated portions spaced apart sufficiently far to constitute independent points of support and to admit of the breaking of pieces of slag or cinder resting on said net, for the purpose described, having means at its corner portions for engagement with a transporting device, substantially as described.

3. As a new article of manufacture, a flexible metallic slag and cinder net consisting of interwoven chains, substantially as described.

4. As a new article of manufacture, a metallic slag and cinder net consisting of outer bounding chains connected at their meeting ends, and a mesh filling composed of two series of chains crossing each other at an angle and linked at their ends into the bounding chains, substantially as described.

In testimony whereof, I have hereunto set my hand.

JOHN BERNARD CLARK.

Witnesses:
G. H. MARTIN,
DAN. P. GORMAN.